United States Patent [19]

Cochran

[11] Patent Number: 4,750,818

[45] Date of Patent: Jun. 14, 1988

[54] PHASE CONJUGATION METHOD

[76] Inventor: Gregory M. Cochran, 1728 E. Commonwealth, #101, Fullerton, Calif. 92613

[21] Appl. No.: 809,214

[22] Filed: Dec. 16, 1985

[51] Int. Cl.⁴ .......................... G02B 26/00; G01J 1/20; G01J 1/00; G06F 7/38
[52] U.S. Cl. .................................. 350/360; 350/393; 250/201; 356/121; 364/725; 364/736
[58] Field of Search .................. 350/360, 354, 393; 250/201; 356/121, 122; 364/736, 754, 725

[56] References Cited

U.S. PATENT DOCUMENTS

| | | | |
|---|---|---|---|
| 4,091,274 | 5/1978 | Angelbeck et al. | 250/201 |
| 4,181,973 | 1/1980 | Tseng | 364/900 |
| 4,438,330 | 3/1984 | Hardy | 250/201 |
| 4,447,886 | 5/1984 | Meeker | 364/725 |
| 4,547,662 | 10/1985 | Cornwell | 250/201 |

OTHER PUBLICATIONS

Pearson et al., "Experimental Studies of a Deformable-Mirror Adaptive Optical System" J. Opt. Soc. Am., vol. 67, No. 3, Mar. 1977, pp. 325-333.

Primary Examiner—Eugene R. LaRoche
Assistant Examiner—Michael R. Shingleton
Attorney, Agent, or Firm—Cislo & Thomas

[57] ABSTRACT

The use of large sensor and phase shifter arrays in phase conjugation adaptive systems is currently limited by the computational power conventionally employed to solve small arrays. Noting that in large arrays many of the derivatives of wavefront slopes are zero, then the properties of sparse matrix mathematics may be used to efficiently calculate the extent of movement of a particular actuator to deform a mirror and thus compensate for phase distortions in an incoming wavefront. Apparatus and methods are provided for handling such large arrays.

12 Claims, 5 Drawing Sheets

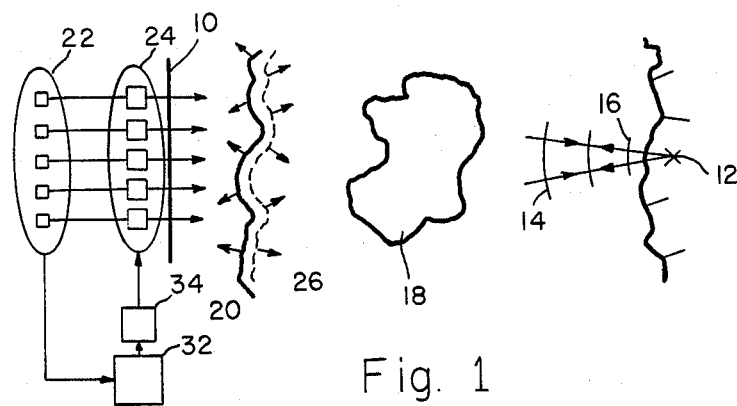
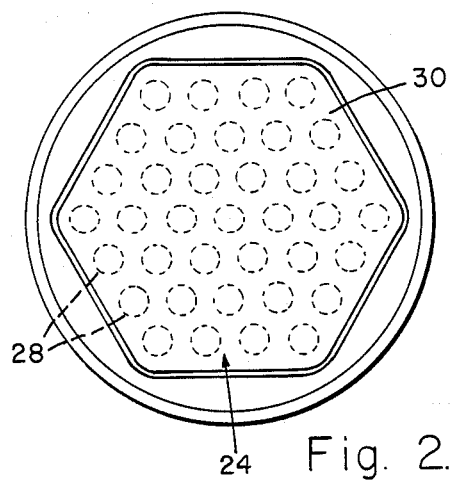
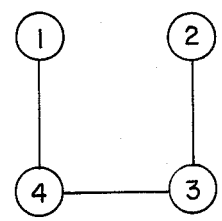
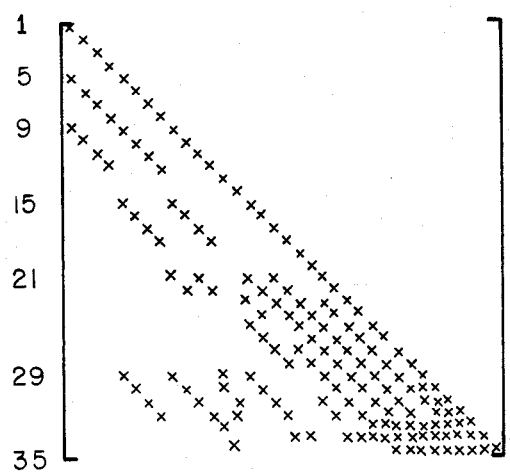
Fig. 1
Fig. 2
Fig. 3
Fig. 5

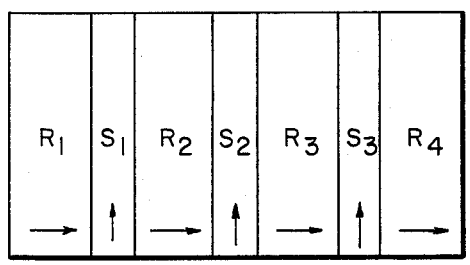
Fig. 6a.
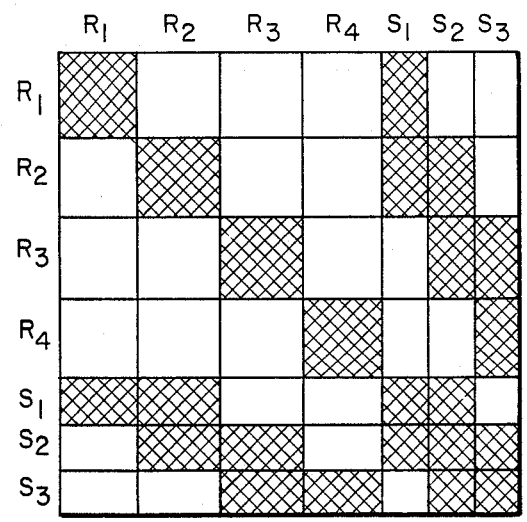
Fig. 6b.
Fig. 7a.
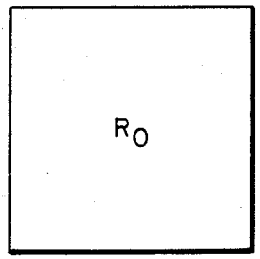
Fig. 7b.
Fig. 7c.
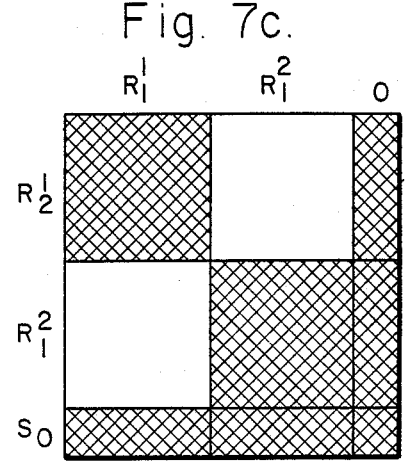
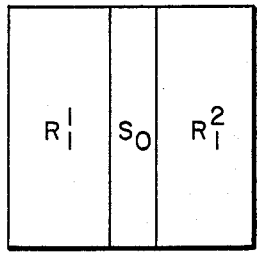
Fig. 7d.
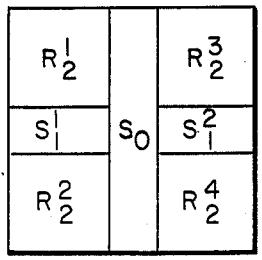
Fig. 7e.

PHASE CONJUGATION METHOD

BACKGROUND OF THE INVENTION

This invention relates to apparatus and method for compensating for atmospheric turbulence, and, more particularly, to the use of sparse matrix algebra to determine in a deformable mirror having several actuators which actuators to move and how much in order to compensate for atmospheric turbulence.

Light traveling through the air undergoes distortions from several sources, including turbulence, wind, water vapor and heat, which cause rapid, small-scale variations in the air's density and hence its refractive index. Consequently, the optical characteristics of the air are changing continuously, both spatially and temporally.

Adaptive optics systems have been employed to correct for distortions of light waves traveling through the atmosphere. Typical adaptive optics systems work as a feed back loop in that a sensor detects a beam distortion and sends a signal to a controller to adjust the optics to remove the distortion.

In one type of system, a deformable mirror, provided with a number of actuators which each can independently deform a portion of the mirror, is employed. These actuators move in and out to adjust the mirror's shape and thus replicate the shape of the optical wavefront. It will be appreciated that the movement of the actuators is on the order of fractions of a wavelength of light.

The typical wavefront control system uses a wavefront slope sensor such as a Hartmann sensor, and uses that information to calculate the commands driving the actuators on a deformable mirror, which corrects for the measured wavefront aberrations or distortions.

In such a conventional adaptive optics system, the estimator is the matrix that is multipled by the measurement vector to obtain an estimate of the wavefront distortion. Although the matrix equations required to compute the wavefront estimator are straight forward, the number of computations required for their direct evaluation is becoming unreasonable for some adaptive optics systems.

Starting with the measurement equation $Hx=s$, the conventional estimate is $$\hat{x}=(H^T H)^{-1} H^T s,$$

where H represents the actuator-subaperture Jacobian (wavefront sensor derivative), x is the vector of actuator commands representing the wavefront error, s is the wavefront slope vector measured by the wavefront slope sensor, $\hat{x}$ is the actuator command estimate vector and $H^T$ is the transpose of H.

Direct evaluation of these equations requires the inversion of an n by n matrix (and therefore approximately $n^3/6$ adds and multiplies). Calculating the estimate requires $n^2$ adds and multiplies, and this may also be excessive for systems that require a high temporal bandwidth. The parameter n refers to the number of wavefront distortion degrees of freedom, such as Zernike polynomial coefficients or commands to deformable mirror actuators. In some proposed systems, n may be over 1,000.

A related estimation algorithm first estimates the OPD (optical path difference) and then performs an amplitude-weighted fit of the actuators to the resulting OPD map. Here, let o be the OPD vector. Let $Go=s$. G is the wavefront sensor/OPD Jacobian, corrected for amplitude effects. Define F so that $Fx=o$, where F is the OPD/actuator Jacobian.

$$\hat{o}=(G^T G)^{-1} G^T s$$

and $$\hat{x}=(F^T W F)^{-1} F^T W o.$$

Here, there will be many more OPD points than slope measurement, to allow for accurate wavefront sensor calibration and weighting of the fit. In an actual implementation of this algorithm, each OPD point corresponds to a pixel on some detector such as a Charge Coupled Device (CCD) or Charge Injection Device (CID). Again, there is a large calculation. The OPD reconstruction will dominate the calculation, requiring the inversion of an $n \times n$ matrix, where n may reach 10,000 or more. The required $n^3$ operations would take a long time. Even the $n^2$ operations required for each estimation, assuming that the estimator has somehow been calculated, are enough to contraindicate this method for large systems despite its superior theoretical performance.

As interest has centered on decreasing the wavelength of light used, the number of actuators for a given deformable mirror must increased. Calculating which actuators must move and the extent of such movement clearly will involve a substantial number of calculations to be performed merely to make one series of adjustments in the deformable mirror. Since the required calculations must be made rather frequently, on the order of 1,000 times per second, it can be seen that an increase in the number of actuators from, say, 100 to 1,000, will tax the computational powers of most affordable computers. Thus, the manner in which the calculations must be performed must be improved.

OBJECTS AND SUMMARY OF THE INVENTION

Accordingly, it is an object of the present invention to reduce the time needed to make the calculations required to determine the particular actuators that must be moved and the amount of distance they must be moved in a deformable mirror used in a wavefront control system.

It is another object of the present invention to provide a method for making the required calculations while saving computer memory.

It is yet another object of the present invention to provide apparatus which, in conjunction with a deformable mirror, a matrix of actuators and associated detectors, will efficiently perform the required calculations to determine the extent of movement of particular actuators and will implement the necessary commands to move such actuators.

These and further objects of the invention will become more readily apparent upon a consideration of the following commentary taken in conjuction with the drawing.

Briefly, a method of operating an adaptive optics system is provided. The system comprises a deformable mirror employing a plurality of actuators to individually deform a portion of the mirror to correct wavefront disturbances and a plurality of sensors that measure the wavefront disturbances. The movement of the actuators and the measurements from the wavefront sensors are interrelated through a matrix H consisting of the derivatives of wavefront slope measurements with respect to acutator motions. Most of the derivatives are zero, making H a sparse matrix.

The method of the invention comprises:
(a) forming an ordering of actuators so that an estimator, which is a set of numbers that operate on the wavefront sensors measurements, will provide actuator commands to move the actuator while substantially retaining sparsity in the estimator;
(b) using the ordering of actuators by sparse numerical techniques to produce the estimator;
(c) storing the estimator;
(d) making the wavefront sensor measurements;
(e) using the estimator to rapidly calculate actuator commands; and
(f) moving the actuators in response to the commands to correct the wavefront disturbances.

Steps (d)-(f) are repeated as necessary to continue to correct wavefront disturbances as they change with time.

Also provided in accordance with the invention is apparatus for correcting wavefront disturbances to improve image quality. The apparatus comprises the deformable mirror, the plurality of wavefront sensors, digital means for efficiently calculating actuator commands from wavefront slope measurements employing sparse matrix calculations, and means for implementing the actuator commands.

As a consequence of the method and apparatus provided by the invention, large arrays of actuators may be adjusted in a considerably shorter period of time than by means of prior art calculations.

The calculations employed in the invention for determining the actuator commands are performed in a manner quite unlike the approaches taken in the prior art. The approach disclosed herein takes advantage of the sparseness of the matrix (a high percentage of zero elements) and does not require a matrix inversion or full matrix multiply. The calculations can be performed on a conventional digital computer and require many fewer operations—more than 100 times fewer for systems with 2,000 or more actuators. Memory requirements are also drastically reduced. The full matrix approach of the prior art requires 100 or more times more memory for systems with 2,000 or greater actuators than the sparse matrix approach utilized herein.

BRIEF DESCRIPTION OF THE DRAWING

FIG. 1 schematically illustrates the operation of a phase conjugation adaptive array;

FIG. 2 is a plan view of an example of a small array of actuators employed in a phase conjugation adaptive array;

FIG. 3 is an example of a graph of a simple actuator scheme, described in connection with minimum degree ordering;

FIG. 5 depicts the L (lower triangular) matrix of the nodal numbering scheme determined in FIG. 4(k);

FIGS. 6(a)-(b) illustrate one-way dissection ordering and the corresponding sparse matrix;

FIGS. 7(a)-(e) illustrate nested dissection ordering in different stages and the corresponding matrix associated with each stage;

DETAILED DESCRIPTION OF THE PREFERRED EMBODIMENTS

Figure 4A:
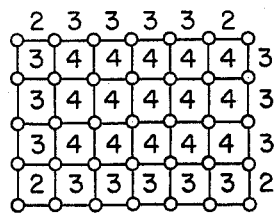
FIGS. 4(a)-(k) depict a 5×7 graph of phase points, or actuators, reduced in sequential stages to obtain a node numbering scheme, employed in connection with minimum degree ordering.

Referring now to the drawing, wherein like numerals of reference refer to like elements throughout, the operation of a typical phase conjugation array is schematically depicted in FIG. 1. An initial plane wave 10 is emitted, such as by lasers (not shown) and illuminates target point 12.

Under ideal conditions, the wavefront 14 converging on the target point is spherical, and the wavefront 16 emanating from the target is also spherical. However, due to the presence of noise, turbulence, measurement errors, atmospheric aberrations, imperfect mirror tracking and the like, the initial plane wave is affected by a disturbance 18. The resulting distorted wavefront illuminates the target 12, and a distorted return wave 20 emanates from the target. The spatial phase distortion of the distorted return wave 20 is measured by a detector array 22. Each detector senses the extent of distortion of the return wave in its sector and actuates a corresponding actuator in phase shifter array 24. An actuator is moved plus or minus a given extent to adjust for the phase distortion. The retransmitted wave 26 forms a reproduction of the distorted return wave 20.

The above-described apparatus may also be used in receiving light, such as star light passing through the atmosphere, to correct for atmospheric disturbances and other aberrations.

FIG. 2 depicts an example of a small array of 37 actuators 24, arranged in a symmetrical, hexagonal 3-ring pattern. Each circle 28 represent an actuator location. Actuators typically are piezoelectric elements; activation of one or more actuators 28 distorts or deforms an overlying mirror 30 to adjust for phase differences of a distorted wave, as described above.

However, it is desired to increase the number of actuators, say to 1,000 or 10,000 or even 100,000. Since calculations must be made many times per second, it will be appreciated that new methods must be devised to handle such large arrays.

In accordance with the invention, additional apparatus is provided to correct wavefront disturbances to improve image quality. In addition to a deformable mirror employing a plurality of actuators to individually deform a portion of the mirror to correct wavefrontdisturbances and a plurality of wavefront sensors, or detectors, that measure wavefront disturbances to provide wavefront slope measurements, the apparatus also comprises digital means 32 for efficiently calculating actuator commands from wavefront slope measurements employing sparse matrix calcucations, and means 34 for implementing the calculated actuator commands to deform a portion of the mirror.

The computational approach taken in accordance with the invention involves two stages: a preparation (or factorization) stage and a solve stage.

In the factorization stage, a description of the array of sensors and actuators is prepared and graph-theoretic calculation of ordering is done. The matrix H, which is the actuator-subaperture Jacobian, or wavefront sensor derivative, is calculated and stored, and the product $H^TH$, where $H^T$ is the transpose matrix of H, is calculated and stored. A symbolic factorization is performed, which determines how many non-zero numbers will appear in the final answer and their location. Finally, the $L L^T$ factorization of $H^TH$ is determined and stored, where L is a lower triangular matrix (an upper triangular matrix U could alternately be employed). Storing of all calculations is conveniently in compact form (i.e., the non-zero portion only).

The factorization stage is done only infrequently and thus is updated upon a substantial change in the sensor or actuator array (e.g., loss of an actuator) or upon a change in the nature of the atmosphere.

In the solve stage, slope data s is input from the wavefront sensors and is multiplied by $H^T$ to create $b=H^Ts$. The equations to be solved are $$L^TLx=b$$

$$Lw=b$$

$$L^Tx=w.$$

Here, s comprises m numbers and b comprises n numbers, where $n \leq m$. The actuator command is given by x, which represents the extent a particular actuator is to be moved to adjust for phase distortion.

The purpose of this invention is to greatly ease the calculations required for an adaptive optics control system. For some systems with many actuators, preparing the inverted matrix is prohibitive because of the huge calculation required. For high-bandwidth adaptive optics applications, the full matrix multiplies required by traditional methods are also very difficult, since they will be required hundreds of times a second.

The new calculation method should allow actuator commands for such high-speed systems to be calculated accurately with a much smaller and more economical standard digital computer. This approach also requires less memory. Generally the percentage memory savings is about the same as the percentage of speedup, i.e., the sparse matrix approach, for a given number of actuators (say 2500) might require 100 times few calculations and require 80 times less fast memory. This new method also requires less precision. Because each input is multiplied by fewer numbers than would be the case for a full matrix inversion approach, there is less roundoff error, and 16 bit arithmetic used in this sparse matrix method gives equivalent or superior performance to 32 bit arithmetic used in the matrix inversion approach. This reduces the memory required again, and allows cheaper standard hardware to be used. Also, in general, all else being equal, 16 bit arithmetic is faster than 32 bit arithmetic. This allows an adaptive optics systems to economize greatly on computing costs without sacrificing performance.

The ability to recalculate the preparation step of matrix factorization at very high speed raises the interesting possibility of changing this estimation matrix in real time. Since the estimation matrix is designed to maximize performance assuming certain systems and environmental conditions, the ability to adjust it very rapidly as environmental conditions vary should give improved performance. For instance, adjustment to currently existing atmospheric parameters as they change should be possible. It should be possible to continuously calibrate for weather effects such as wind gusts at high altitudes. It should also eventually be possible, largely because of the possibility of using parallel processors, to recalculate the estimator on a millisecond basis in order to deal with scintillation, the variation of the intensity of the light (not just the phase) that causes the familiar twinkling of stars. It should be emphasized that this real-time recalibration of the estimator is impossible using the typical matrix inversion approach, since the larger problems (with 100,000 phase points) would require several months on a Cray-1 computer for the matrix inversion. This sparse factorization approach is more than a million times faster (1,000,000 times) and creates this possibility of real-time calibration using currently available circuit chips.

It may be observed that all these Jacobian matrices are sparse. That is, each actuator only affects a small percentage of the wavefront sensors, and each OPD point affects only a few wavefront sensors. For the large systems that are of particular concern, the percentage of non-zero elements is k/n, where k is of the order of 10. Reformulating the problem, define A so that $$A=(H^TH)$$

and define b so that $$b=H^Ts$$

The estimation equation can now be rewritten $$Ax=b$$

A is still sparse; for an element $A_{ij}$ to be non-zero, there must be a wavefront subaperture that is affected by both actuator i and actuator j. For a typical actuator/subaperture geometry, this might mean when i and j neighbors or next nearest neighbors. Now, the sparity of H is easily exploited when forming b from s; it is a straight multiplication and one simply ignores all the zeroes. This particular part of the calculation is easily reduced from $n \times m$ operations (where m is the number of subapertures) to $k \times n$ operations. However, the next step is not so simple.

$$x=A^{-1}b$$

is not a good thing, because $A^{-1}$ is in general not sparse even when A is. The next attempt is a factorization of A:

$$A=LL^T$$

which is possible, since A is symmetric and positive definite. x is then obtained by solving $Ly=b$ and $L^Tx=y$.

A brief description of the factorization process follows. The A matrix, the matrix in the equation $Ax=b$ that is to be solved, is reduced to upper triangular form in the following manner. The first row is normalized; it is divided by the first element, so that the first element in the modified row is now 1.0. A suitable multiple of this first row is now subtracted from the second row, and the modified second row is normalized also, by dividing all elements of the second row by the second element. The first two rows now look like this:

| 1 | x | x | x | x |
|---|---|---|---|---|
| 0 | 1 | x | x | x |

This process of subtraction and normalization continues. Suitable multiples of the first and second rows are subtracted from the third so that its first two elements are zero, and then the third row is normalized, resulting in this:

| 1 | x | x | x | x |
|---|---|---|---|---|
| 0 | 1 | x | x | x |
| 0 | 0 | 1 | x | x |

This process is continued until all the entries below the diagonal are zero. It should be noted that as soon as a given row is completed, it can be used in the modification of all lower rows. This is a clear application for multiple processors. As soon as a row is finished, it can be used by several processors, each working on one or more lower rows. This allows the factorization to be speeded up by a factor of approximately P times, where P is the number of independent processors. This will be true as long as P is equal to or less than N, the number of variables being solved. N is also equal to the number of rows. The solution of the equation $Ax=b$ using sparse L—U decomposition is relatively easy to describe. The equation is represented in two sets of equations:

$$Ly=b$$

(where b represents the measured slope inputs) and $$L^T x = y.$$

L is a lower triangular matrix, and the equations are easy to solve.

$$a_{11} y_1 \quad (1)$$

$$a_{21} y_1 + a_{22} y_2 = b_2 \quad (2)$$

$$a_{31} y_1 + a_{32} y_2 + a_{33} y_3 = b_3 \quad (3)$$

etc. Equation (1) is solved simply: $y_1 = b_1/a_{11}$. Equation (2) is solved just as simply, once the solution to equation (1) is available. Continuing down, each y is easily solved for. In solving the second set of equations for x, the procedure is essentially the same, since if L is triangular, $L^T$ is also triangular. The major difference is that one must begin with the $y_n$, the last value of y solved in the initial calculation. Again it should be noted that as soon as a given $y_i$ is calculated, it can be used in doing part of the calculation for all lower equations (and in the second step, as soon as each $x_i$ is calculated, it can be used in all higher rows). This feature again lends itself to using parallel processors, which can begin performing the required multiplications and additions as soon as a given y or x has been calculated. Thus, it will be appreciated that the solution may be speeded up essentially P times by using P processors, as long as P is less than N, the number of variables being solved for.

When A is factored, it suffers fill; L will usually have far more non-zero elements than the lower triangular part of A. A reordering of the problem can often reduce the amount of fill. For any $N \times N$ permutation matrix P, the matrix $P A P^T$ is also symmetric and positive definite, so we can instead solve the equation.

$$(P A P^T)(Px) = Pb$$

A particular P may completely fill the Cholesky factor L for a particular A, while a different P may produce an L with no fill. This illustrates the importance of the choice of P. This choice is usually referred to as the ordering problem, and algorithms for finding P are called ordering algorithms.

ORDERING METHODS

A.

Several ordering methods are applicable to these problems resulting from adaptive optics calculations. The three methods that presently seem most useful are the minimum degree method, the one-way dissection method, and the nested dissection method, all discussed below. The discussion is presented in terms of simple examples. However, it will be appreciated that these methods are applicable to large matrices. Other ordering methods which accomplish substantially the same purpose may also be used.

1. MINIMUM DEGREE ORDERING

The minimum degree algorithm is one of many methods used to find a rearrangement of the derivative matrix that leads to an efficient factorization. To begin with, the sparse matrix representing the adaptive optics system is examined, and a graph equivalent to this matrix is prepared. In this graph, each node corresponds to an actuator, and each line represents a non-zero coefficient in the matrix that links two actuators. For instance, the matrix

| 1 | 0 | 0 | 1 |
|---|---|---|---|
| 0 | 1 | 1 | 0 |
| 0 | 1 | 1 | 1 |
| 1 | 0 | 1 | 1 | corresponds to the graph shown in FIG. 3.

In the minimum degree method, a node with the minimum number of connections is assiged number 1 and removed from the graph. The new graph (with node 1 removed) is examined and whatever node has the fewest connections is numbered 2 and removed. This process is continued until all nodes are removed.

Using graph theoretic notation, the steps in this approach can be described as follows:

Step 1: (Minimum degree selection) In the elimination graph $$G_{i-1} = (X_{i-1}, E_{i-1})$$

choose a node $x_i$ of minimum degree in $G_{i-1}$.

Step 2: (Graph transformation) Form the new elimination graph $$G_i = (X_i, E_i)$$

by eliminating the node $x_i$ from $G_{i-1}$.

Step 3: (Loop or stop) i is replaced by i+1. If $i > |X|$, stop. Otherwise, go to step 1.

A somewhat more complex arrangement is depicted in FIGS. 4–5. In FIGS. 4(a)-(k), a 5×7 graph is depicted. The nodes are numbered as to the number of connections to each node. FIG. 4(a) shows the initial graph with numbers of connections along side each node. FIGS. 4(b)-(j) show graphs of stages during the reduction and FIG. 4(k) shows the resulting node numbering scheme.

Figure 4B:
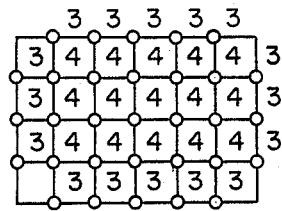
Figure 4C:
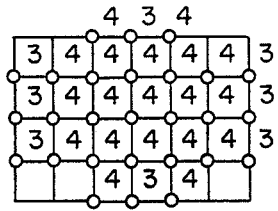
Figure 4D:
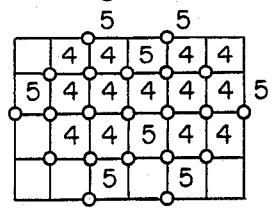
Figure 4E:
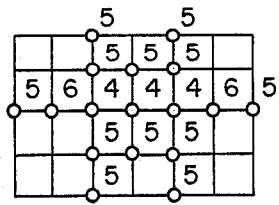
Figure 4F:
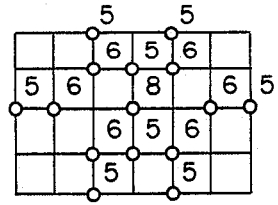
Figure 4G:
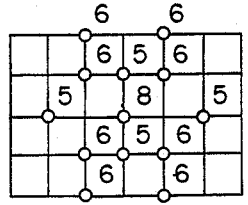
Figure 4H:
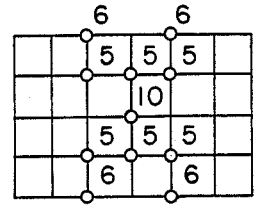
Figure 4I:
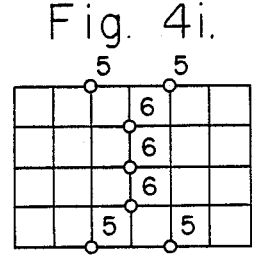
Figure 4J:
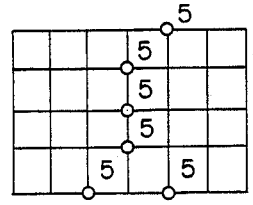
Figure 4K:
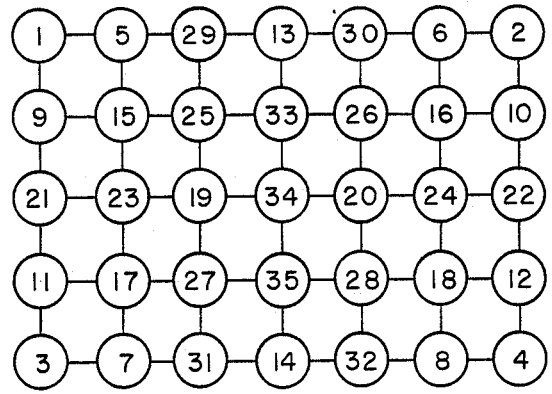

Once the corner nodes in this example are removed to modify the graph to that shown in FIG. 4(b), and since all the edge nodes have the same number of connections, there are various possible choices for the next set of nodes to be eliminated. FIGS. 4(c)-(j) show a possible continuation scheme. The L matrix of the nodal numbering shown in FIG. 4(b) is shown in FIG. 5.

b. One-Way Dissection Method

Assume the usual m×m grid with n points ($n=m^2$). Let s be a small integer such that s is greater than or equal to 1 and s is much less than m, the grid dimension. Now choose s vertical grid lines which dissect the grid into s+1 independent blocks $R_1, R_2, \ldots$ of about the same size. An example with s=3 is shown in FIG. 6.

The nodes of each R-set are numbered sequentially, following lines from left to right as closely as possible, and starting at the bottom left as indicated by the arrows. When all R-sets have been numbered, the separators S are also numbered sequentially, as the arrows show.

The matrix associated with the finite element grid is partitioned into blocks as shown in FIG. 6, where all non-zeros are confined to the cross-hatched areas. If Gauss elimination is performed on this matrix, fill-in will result only inside the cross-hatched areas, which are themselves not completely full.

This method is relatively easy to analyze, and the number of operations required for factorization and for each solve can be predicted in advance. The factorization step requires sqrt (28/3) $n^{(7/4)}$ multiplications, and the solution requires 4 sqrt(3) $n^{(5/4)}$ multiplications.

c. Nested Dissection

The nested dissection method is another ordering procedure and is related to the one-way dissection procedure. It seems to be the fastest of all the ordering methods, in terms both of factorization time and solution time. This method seems especially likely to be the fastest method for very large numbers of actuators or phase points.

Nested dissection is a method for systematically partitioning the graph associated with a matrix using separators. When a separator is found, its vertices are labelled and removed from the graph, leaving the graph partitioned into two or more components. Separators are then found for each component, and the procedure is continued forming smaller and smaller nests, until all vertices have been numbered. The matrix can then be permuted accordingly. The nested dissection ordering obtained in this way has several desired properties.

The idea is illustrated in FIGS. 7(a)-(e). Assume that the set of vertices is represented by a rectangle $R_o$, FIG. 7(a). A separator $S_o$ is chosen, consisting of a set of vertices, the removal of which leaves the graph disconnected into two (in this example) components, $R_1{}^1$ and $R_1{}^2$, as shown in FIG. 7(b). The vertices in $R_1{}^1$ are numbered first, then those in $R_1{}^2$ and finally those in $S_o$. The zero-nonzero pattern induced in the matrix by this numbering is shown in FIG. 7(c), where the areas in which the non-zeros are confined are shaded. This arrangement of the matrix has the important property that the fill-in caused by Gauss elimination with diagonal pivoting is also confined to the shaded areas.

The procedure is repeated recursively. $R_1{}^1$ is partitioned by a separator $S_1{}^1$ into two disconnected components, $R_2{}^1$ and $R_2{}^2$. $R_1{}^2$ is partitioned by $S_1{}^2$ into $R_2{}^3$ and $R_2{}^4$. The sets are renumbered in the order $R_2{}^1 R_1{}^2$, $S_1{}^1$, $R_2{}^3 R_2{}^4 S_1{}^2$. As before, $S_o$ is numbered least; the scheme is depicted in FIG. 7(d). The new arrangement of the matrix corresponding matrix is shown in FIG. 7(e). Again, the fill-in will be confined to the shaded areas, which are now smaller. As the procedure progresses and the partitioning becomes finer, R-sets will eventually be found which have no separators. When one such R-set is found, the corresponding S-set is taken equal to the R-set and its vertices are numbered. The procedure terminates when no more R-sets exist.

As an example, let X be the set of vertices of the sqrt(n)×sqrt(n) rectangular grid. Let S0 consist of the vertices on a mesh line which as nearly as possible divides X into two equal parts R1 and R2. If we number the nodes of the two components r1 and r2 row by row, followed by those in S0, a one level dissection ordering generated. For example, for a 10 by 10 grid:

| 86 | 87 | 88 | 89 | 90 | 100 | 40 | 39 | 38 | 37 |
| 81 | 82 | 83 | 84 | 85 | 99 | 36 | 35 | 34 | 33 |
| 76 | 77 | 78 | 79 | 80 | 98 | 32 | 31 | 30 | 29 |
| 71 | 72 | 73 | 74 | 75 | 97 | 28 | 27 | 26 | 25 |
| 66 | 67 | 68 | 69 | 70 | 96 | 24 | 23 | 22 | 21 |
| 61 | 62 | 63 | 64 | 65 | 95 | 20 | 19 | 18 | 17 |
| 56 | 57 | 58 | 59 | 60 | 94 | 16 | 15 | 14 | 13 |
| 51 | 52 | 53 | 54 | 55 | 93 | 12 | 11 | 10 | 9 |
| 46 | 47 | 48 | 49 | 50 | 92 | 8 | 7 | 6 | 5 |
| 41 | 42 | 43 | 44 | 45 | 91 | 4 | 3 | 2 | 1 |

In order to get a nested dissection, one continues dissecting the remaining two components, and continues until the groups produced are too small to split up. The final result in this case looks like the following:

| 78 | 77 | 85 | 68 | 67 | 100 | 29 | 28 | 36 | 20 |
| 76 | 75 | 84 | 66 | 65 | 99 | 27 | 26 | 35 | 19 |
| 80 | 79 | 83 | 70 | 69 | 98 | 31 | 30 | 34 | 21 |
| 74 | 73 | 82 | 64 | 63 | 97 | 25 | 24 | 33 | 18 |
| 72 | 71 | 81 | 62 | 61 | 96 | 23 | 22 | 32 | 17 |
| 90 | 89 | 88 | 87 | 86 | 95 | 40 | 39 | 38 | 37 |
| 54 | 53 | 60 | 46 | 45 | 94 | 10 | 9 | 16 | 3 |
| 52 | 51 | 59 | 44 | 43 | 93 | 8 | 7 | 15 | 2 |
| 56 | 55 | 58 | 48 | 47 | 92 | 12 | 11 | 14 | 4 |
| 50 | 49 | 57 | 42 | 41 | 91 | 6 | 5 | 13 | 1 |

Perhaps most importantly, the performance of this ordering algorithm can easily be analyzed. The factorization requires 829 $n^{(3/2)}/84$ multiplications and the same number of additions, while each solve requires 31 (n log n/2)/4 multiplications (and additions), when there are n points. This should be compared with the 1/6 $n^3$ adds and multiplies required for an invention, and $n^2$ adds and multiplies for an ordinary solve when sparsity is not used.

Figure 8:
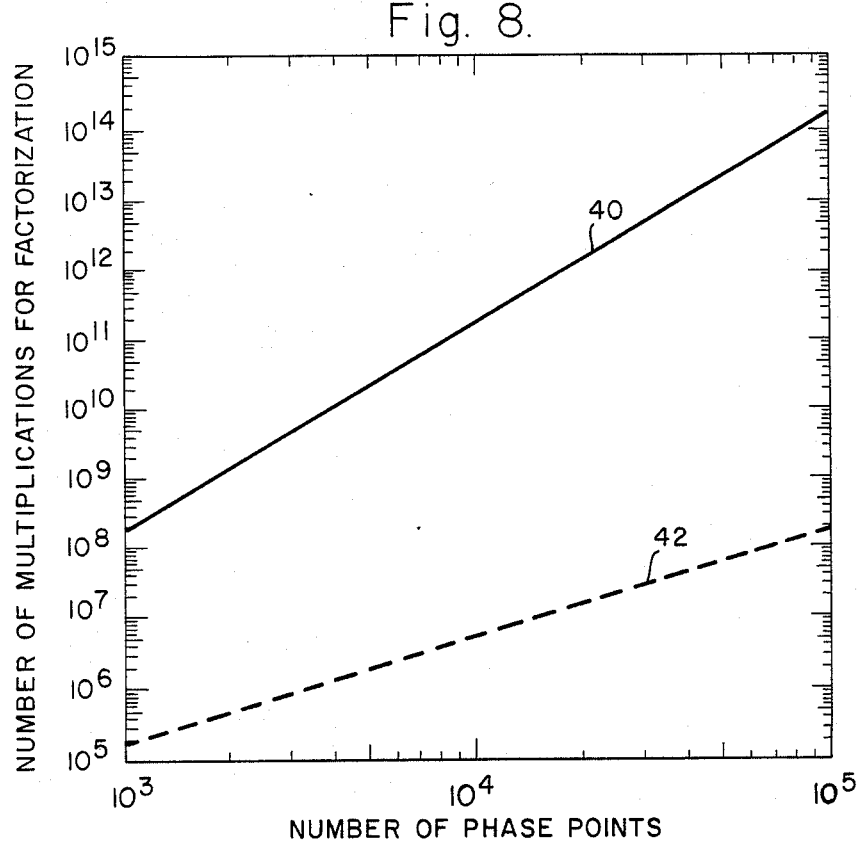
FIG. 8 graphically depicts the number of multiplications required for the factorization stage as a function of the number of phase points, or actuators, for both a prior art approach and a nested dissection ordering approach.
Figure 9:
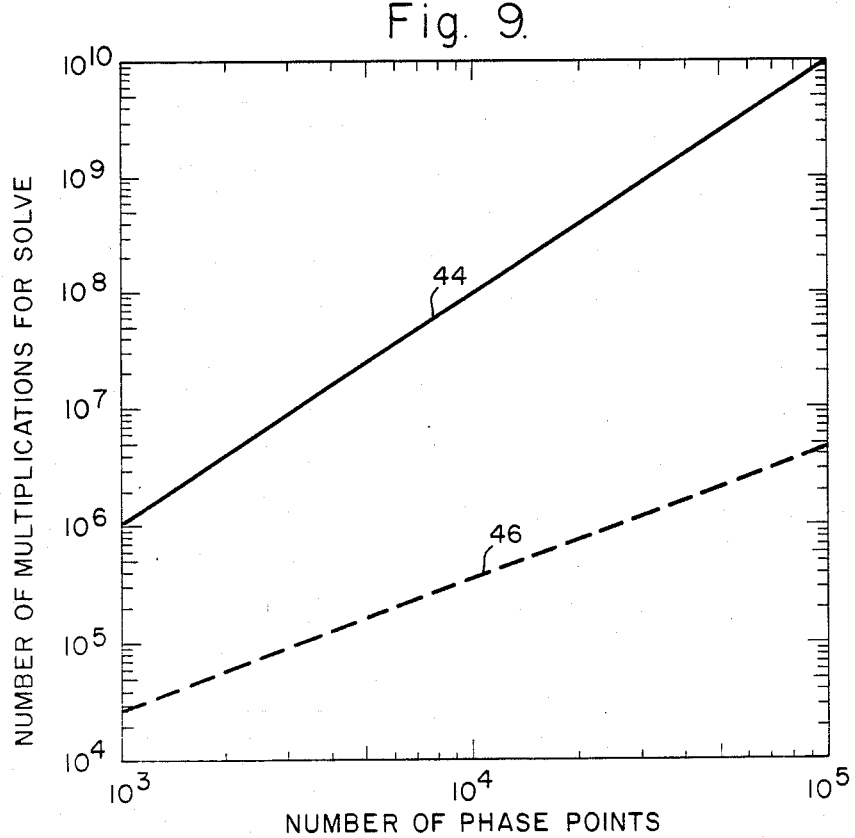
FIG. 9 graphically depicts the number of multiplications required for the solve stage as a function of the number of phase points, or actuators, for both the prior art approach and the nested dissection ordering approach.
Figure 10:
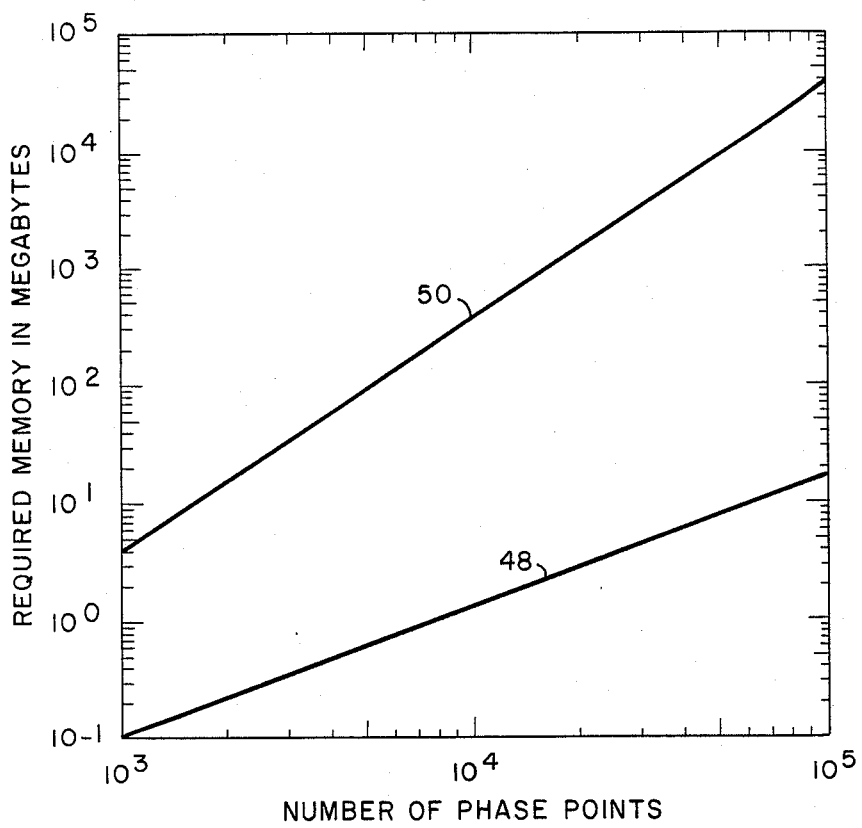
FIG. 10 graphically depicts the required memory for handling the calculations as a function of the number of phase points, or actuators, for both the prior art approach and the nested dissection ordering approach.

The advantages of the approach of the invention over the prior art is depicted in FIGS. 8-10, which graphically illustrate the number of multiplications for the factorization step and the solve step and the amount of memory required, all as a function of the number of phase points, or actuators. In particular, curve 40 of FIG. 8 represents the number of multiplications for the factorization step of the conventional matrix inversion prior art approach, while curve 42 represents the same data for the approach in accordance with the invention, using nested dissection sparse matrices. The ratio of curve 40 to curve 42 provides an indication of the speed advantage provided by the teachings of the invention. For example, for 1,000 actuators, the approach in accordance with the invention is about 1,000 times as fast as for the prior art approach; for 10,000 actuators, the speed advantages increases to about 20,000 times, while for 100,000 actuators, the speed advantage increases to about 1,000,000 times.

While the speed advantage is not as dramatic for the solve step, it is nonetheless considerable. Curve 44 of FIG. 9 represents the number of multiplications for the solve step of the conventional matrix inversion prior art approach, while curve 46 represent the same data for the nested dissection sparse matrix approach of the invention. The speed advantage provided by the approach of the invention, as above, increases with an increasing number of actuators, ranging, for example, from 38 times for 1,000 actuators to about 200 times for 10,000 actuators to 2,200 times for 100,000 actuators.

The amount of memory in megabytes required by the approach of the invention is only about 18 megabytes even for an array of 100,000 actuators as shown by curve 48 of FIG. 10; this is well within the capacity of presently available commercial computers, particularly if ganged in parallel fashion, as described above. The prior art matrix inversion approach, however, requires 18 megabytes for an array of only 2,000 actuators; for 100,000 actuators, about 40,000 megabytes of memory would be required, as shown on curve 50 of FIG. 10.

Thus, there has been disclosed a method for determining in a deformable mirror comprising a number of actuators which actuators are to be moved and how much in response to atmospheric distortion. Further, there has been disclosed apparatus employing the foregoing method. Various changes and modifications of an obvious nature will make themselves available to those of ordinary skill in the art, and all such changes and modifications are considered to be within the scope of the invention as defined by the appended claims.

What is claimed is:

1. A method of operating an adaptive optics system comprising (1) a deformable mirror employing a plurality of actuators to individually deform a portion of the mirror to correct wavefront disturbances and (2) a plurality of wavefront sensors that measure said wavefront disturbances, the movement of said actuators and the measurements from said wavefront front sensors being inter-related through a matrix H consisting of the derivatives of wavefront slope measurements with respect to actuator motions, most of which derivatives being zero, making H a sparse matrix, said method comprising:
    (a) forming an ordering of actuators so that an estimator, which is a set of numbers that will solve the equation $\hat{X} = (H^T H)^{-1} H^T s$ wherein s is the wavefront sensor measurement, will provide actuator commands to move said actuator while substantially retaining sparsity in the estimator;
    (b) using said ordering of actuators by sparse numerical techniques to produce said estimator;
    (c) storing said estimator;
    (d) making said wavefront sensor measurements;
    (e) using said estimator to rapidly calculate actuator commands; and
    (f) moving said actuators in response to said commands to correct said wavefront disturbances.

2. The method of claim 1 in which steps (d)–(f) are repeated as necessary to continue to correct wavefront disturbances as they change with time.

3. The method of claim 1 in which steps (a)–(c) are repeated when there has been a change in said system or in turbulence characteristics.

4. The method of claim 1 in which said ordering is accomplished by minimum degree ordering, wherein in an elimination graph $$G_{i-1} = (X_{i-1}, E_{i-1})$$

a node $X_i$ of minimum degree in $G_{i-1}$ is chosen, a new elimination graph $$G_i = (X_i, E_i)$$

is formed by eliminating the node $X_i$ from $G_{i-1}$, i is replaced by $i+1$, and if $i > |X|$, then the process is complete, otherwise a new mode is chosen and the method is repeated.

5. The method of claim 1 in which said ordering is accomplished by one-way dissection, wherein in an $m \times m$ grid with n points, s is chosen to be a small integer greater than or equal to 1 and much less than m, s vertical grid lines are chosen which dissect the grid into $s+1$ interdependent blocks to form a set of blocks labelled $R_1, R_2$, etc. of about the same size, nodes in each R-set are numbered sequentially, followed by the numbering of each separator S set, the matrix associated with the element grid is partitioned into blocks, and all non-zero elements confined to specific areas.

6. The method of claim 1 in which said ordering is accomplished by nested dissection, wherein in a graph associated with a matrix, a separator is found, its vertices labelled and removed from the graph, leaving the graph partitioned into two or more components, separators are found for each component, and continuing the procedure to form smaller and smaller nests, until all vertices have been numbered.

7. Apparatus for correcting wavefront disturbances to improve image quality, said apparatus comprising:
    (a) a deformable mirror employing a plurality of actuators to individually deform a portion of the mirror to correct wavefront disturbances;
    (b) a plurality of wavefront sensors that measure wavefront disturbances to provide wavefront slope measurements;
    (c) digital means for efficiently calculating actuator commands from wavefront slope measurements employing sparse matrix calculations.
    (d) means for implementing said calculated actuator commands to deform said portion of said mirror;
wherein said digital means includes means
    (i) to form an ordering of said actuators so that an estimator, which is a set of numbers that operate on the wavefront sensor measurements, will provide actuator commands to move said actuator while substantially retaining sparsity in the estimator;
    (ii) to use said ordering of actuators by sparse numerical techniques to produce said estimator;
    (iii) to store said estimator;
    (iv) to make said wavefront sensor measurements;
    (v) to use said estimator to rapidly calculate actuator commands; and
    (vi) to move said actuators in response to said commands to correct said wavefront disturbances.

8. The apparatus of claim 7 in which means are included to repeat functions (iv)–(vi) as necessary to continue to correct wavefront disturbances as they change with time.

9. The apparatus of claim 7 in which means are included to repeat functions (i)–(iii) when there has been a change in said system or in turbulence characteristics.

10. The apparatus of claim 7 which includes means to accomplish said ordering by minimum degree ordering, wherein in an elimination graph $$G_{i-1} = (X_{i-1}, E_{i-1})$$

a node $X_i$ of minimum degree in $G_{i-1}$ is chosen, a new elimination graph $$G_i = (X_i, E_{i-1})$$

is formed by eliminating the node $X_i$ from $G_{i-1}$, i is replaced by i+1, and if $i > 1 \times 1$, then the process is complete otherwise a new mode is chosen and the method is repeated.

11. The apparatus of claim 7 which includes means to accomplish said ordering by one-way dissection, wherein in an m×m grid with n points, s is chosen to be a small integer greater than or equal to 1 and much less than m, s vertical grid lines are chosen which dissect the grid into s+1 interdependent blocks to form a set of blocks labelled $R_1$, $R_2$, etc. of about the same size, nodes in each R-set are numbered sequentially, followed by the numbering of each separator S set, the matrix associated with the element grid is partitioned into blocks, and all non-zero elements confined to specific areas.

12. The apparatus of claim 7 which includes means to accomplish said ordering by nested dissection, wherein in a graph associated with a matrix, a separator is found, its vertices labelled and removed from the graph, leaving the graph partitioned into two or more components, separators are found for each component, and the procedure is continued, forming smaller and smaller nests, until all vertices have been numbered.

* * * * *